Jan. 13, 1948.　　C. D. LAUGHLIN ET AL　　2,434,419
PROCESS OF REGENERATING ADSORBENT
Filed Sept. 21, 1944
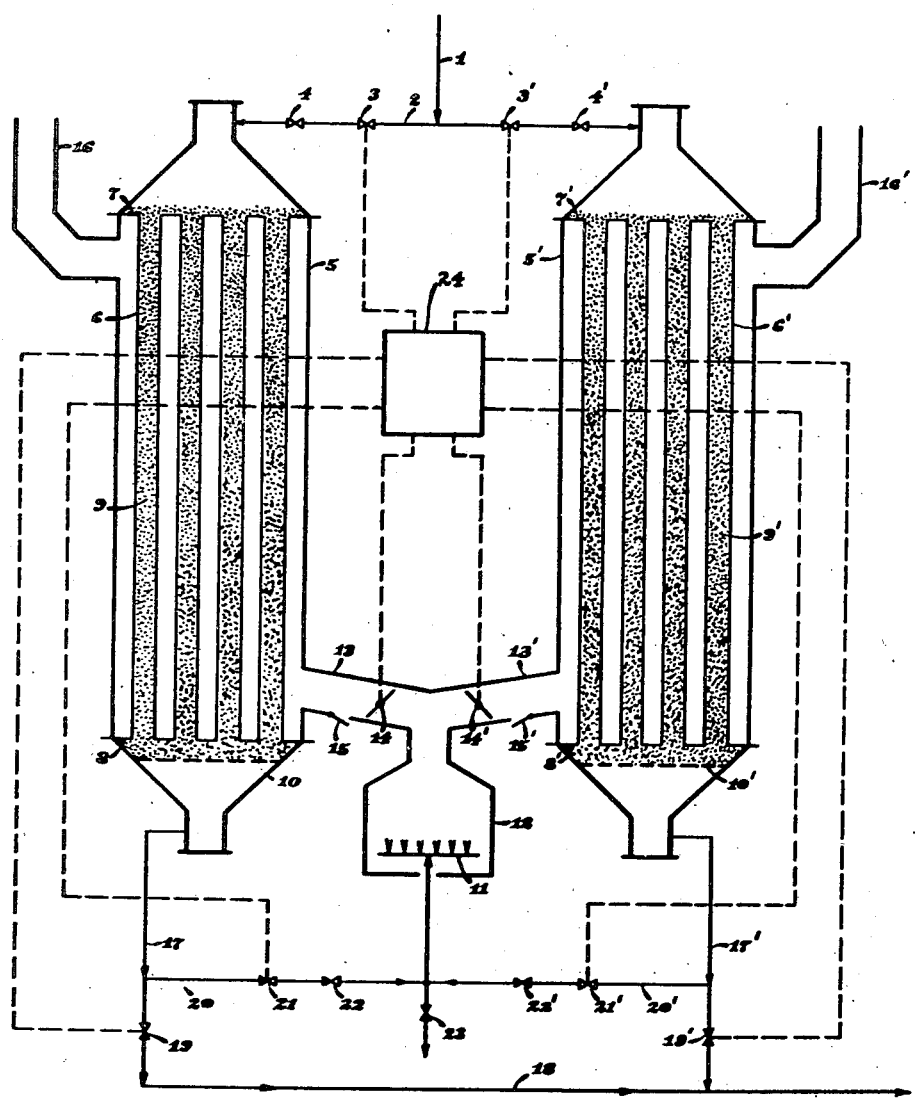
Attest
John G. Butz
Andrew T. Zodl
Inventors
Carl D. Laughlin
Harry M. Gwyn, Jr.
By Norbert E. Buch
　　　Attorney Patented Jan. 13, 1948

2,434,419

UNITED STATES PATENT OFFICE 2,434,419

PROCESS OF REGENERATING ADSORBENTS

Carl D. Laughlin, Drexel Hill, and Harry M. Gwyn, Jr., Philadelphia, Pa., ass'gnors to Attapulgus Clay Company, Philadelphia, Pa., a corporation of Delaware Application September 21, 1944, Serial No. 555,179

3 Claims. (Cl. 34—35)

The present invention relates to the dehumidification of fluids by means of solid adsorbents and the regeneration of such adsorbents, and relates more particularly to the removal of moisture from combustible gases such as natural gas, hydrocarbon gases from petroleum refinery operations, and gases associated with the production of crude oil.

An object of this invention is to provide a simple and inexpensive method for partially or completely dehumidifying combustible gases using a solid adsorbent as the dehumidifying agent, and regenerating the adsorbent by heat exchange with combustion gases resulting from the burning of a portion of the combustible gases passed through the dehumidifying adsorbent.

When drying fluids by means of solid adsorbents, selection of the gas to be used for regeneration of the moisture laden desiccant is in many cases dictated by the nature of the fluid being dried. When drying combustible gases, for example, the regeneration gas must be either an inert gas or a gas similar to that being dried. We have found that this requirement for regeneration gas is satisfactorily met by using a portion of the same gas which is being dried.

The quantity of regeneration gas required in the conventional multiple tower regeneration dryer is the amount necessary to raise the temperature of the desiccant and holder to regeneration temperature and to evaporate and carry away the adsorbed water. Due to the relatively low specific heat, and therefore the low heat carrying capacity of gases, the quantity of gas necessary to transfer this amount of heat to the desiccant is excessive when compared with the dried gas output of a dryer unit, and represents in many instances a direct waste of gas, since in very few cases is it possible to utilize any appreciable amount of it for other purposes. The quantity of regeneration gas, based on the dried gas output of a unit, may vary from a minimum of 10% up to 100% or more, depending upon dryer operating conditions. The loss in pressure in the regeneration gas, its wet condition, or the remote location of the dryer unit, and other conditions, will prevent its economical utilization in most cases without the installation of expensive auxiliary equipment for compressing, cooling, dewatering, etc., to recondition it for reinjection or other purposes. Although all regeneration operations require heat, the total calorific value of the quantity of regeneration gas required from the heat carrier standpoint is far in excess of that necessary to supply the actual regeneration heat by combustion, and the utilization of only a relatively small fraction as a fuel is therefore possible in the conventional multiple tower dryer.

Solid adsorbents have been found superior to other drying media for the drying of liquids and gases, in that much lower absolute humidities and dew points are attainable in the dried fluids, however, more widespread use of the solid adsorbents has been in many cases prevented by the cost of the plants and by the operator attention incident to plant manipulation necessitated by the frequent cycle changes. This manipulation has not lent itself particularly to automatic control in the conventional solid adsorbent dryer, and any simplification which would permit fully automatic operation would contribute much to the art of drying with solid adsorbents. Operators would be enabled to take advantage of the above mentioned high drying performance in applications now closed to the use of solid adsorbents by the prohibitive cost of the units, by the excessive loss of gas, or by the plant servicing and attention required. A unit featuring fully automatic operation could, for example, be installed in a remote location, or multiple units combining both automatic operation and low cost features could be used in decentralized drying service, as for example, in the field drying of natural gas at individual well heads.

In accordance with our invention, we have provided a solid adsorbent dryer and regenerator system which is simple in design, inexpensive in construction, and well adapted for automatic control.

Our invention may be further understood with reference to the accompanying drawing which illustrates diagrammatically a system suitable for carrying out our process.

Since the present invention is carried out using a continuous system, we have shown in the drawing, duplicate dryers one of which is on the drying or adsorption cycle, while the other is on the regeneration cycle.

Referring to the drawing, in which corresponding elements are similarly numbered, there is provided a combustible gas supply pipe 1 connected to a manifold 2 carrying main valves 3 and 3' and reducing valves 4 and 4'. The manifold 2 communicates with the upper section of casings 5 and 5', each of which is provided with a plurality of vertical, horizontally-spaced adsorbent-carrying tubes 6 and 6'. These tubes are positioned by means of conventional headers or tube sheets 7 and 7', and 8 and 8' disposed across the upper and lower sections of casings 5 and 5', respectively. The vertical tubes 6 and 6' are filled with a granular adsorbent 9 and 9' of suitable mesh, for example, activated bauxite of from 2 to 60 mesh, and preferably 4 to 8 mesh, the adsorbent being supported upon screens 10 and 10' disposed in the lower section of the casings 5 and 5', respectively. The annular space between tubes 6 and 6' is adapted for the passage of combustion gases from the burner 11 housed in furnace 12, such combustion gases passing from the furnace through flues 13 and 13' provided with shut-off valves or dampers 14 and 14' and air inlet valves 15 and 15'. Combustion gases from the furnace 12 passing upwardly through the annular space within casings 5 and 5' serve to supply heat to tubes 6 and 6' and thus indirectly to the adsorbent 9 and 9' contained in these tubes. The upper section of casings 5 and 5' is further provided with stacks 16 and 16', respectively, to carry off the combustion gases passing through the annular space of the casings. Leading from the lower section of casings 5 and 5' are dried gas drawoff pipes 17 and 17' communicating with dried gas manifold 18, which in turn is connected with storage facilities or pipe lines not shown. Drawoff pipes 17 and 17' are provided with valves 19 and 19', respectively. Extending from pipes 17 and 17' to the burner 11 are combustible gas supply pipes 20 and 20', respectively, for supplying processed gas to said burner to furnish heat for regeneration. Supply pipes 20 and 20' are provided with main valves 21 and 21' and reducing valves 22 and 22', as well as with a valve-controlled vent pipe 23.

As shown in the drawing the wet gas main valves 3 and 3', the flue valves or dampers 14 and 14', the dried gas valves 19 and 19', and the burner main valves 21 and 21' are adapted for automatic operation and may be operated electrically by means of a time-controlled switching means designated 24. Since the specific mechanism for operating the valves and the time-controlled means is well known in the art, and per se, is not considered as novel or as constituting our invention, it is believed that detailed consideration thereof is here unnecessary. Suffice to point out that the valves in question may be electrically operated and are shown as connected to the control device 24 by means of the dotted lines representing electric cables.

In operation, combustible gas is supplied to pipe 1 from a source not shown, and which may, for example, be a natural gas well producing a mixture of hydrocarbons in which methane predominates. Such gas may be supplied at any desired superatmospheric pressure, and may in fact be at well head pressure, i. e., pressures up to 2500 pounds per square inch. This wet gas is passed through pipe 1 and pipe 2 into the upper section of casing 5, valve 3 being open, and reducing valve 4 likewise being open if it is desired to carry out the drying cycle at normal line pressure. However, if it is desired to effect drying at less than normal line pressure, the reducing valve 4 may be brought into operation to accomplish the desired pressure reduction. The wet gas, in flowing downwardly through tubes 6 containing the granular adsorbent, is dehumidified to the desired extent and is withdrawn from the lower section of casing 5 through pipe 17, valve 19 and pipe 18, and passed to storage or otherwise disposed of, for example, by transportation through pipe lines to places of use. During this drying cycle, the burner main valve 21 in pipe 20 is closed, and no combustible gas is supplied from pipe 17 to the burner 11. Furthermore the valve 14 or damper in flue 13 is likewise closed, thus preventing the flow of combustion gases from the furnace 12 from entering the casing 5. At such time as the adsorbent capacity for moisture of the adsorbent becomes substantially reduced, as determined by the dew point of the processed gas, the supply of wet gas to the adsorbent in casing 5 is throttled by manipulation of valve 3 and closure of valve 19. The burner main valve 21 is opened and reducing valve 22 is adjusted to reduce the pressure of the gas sufficiently to operate satisfactorily in burner 11. The valve 14 or damper in flue 13 is opened, the furnace 12 is lighted, and the combustion products are passed through the flue 13 into the annular space between the tubes 6 of casing 5. The temperature of the combustion products may be regulated by admitting air, as required, through the valve 15 in flue 13. In order to drive off adsorbed moisture from the adsorbent in tubes 6, it is usually necessary to bring the temperature of the adsorbent within the range of 300° F. to 700° F., the higher temperature being required when the regeneration is carried out under a substantial superatmospheric pressure. The combustion products, in passing upwardly through the annular space in casing 5, impart heat to the tubes 6 and thus eventually raise the temperature of the adsorbent to the desired level. In order to assist in purging the adsorbent, a continuous flow of wet gas at a diminished rate is passed through the adsorbent in the tubes. In many cases, the quantity of gas required for heating is substantially equivalent to the quantity required for purging, in which event the process operates at its most economical level. In other words, all of the purging gas is used as fuel, and none need be vented through valve controlled pipe 23. In those instances where the quantity of purge gas required is greater than that needed as fuel for the regeneration, the excess may be vented or otherwise disposed of. By balancing the operation with respect to purging gas and fuel gas required, the total quantity of gas used is very small, i. e., of the order of 1% to 2% or less of the total gas processed, as compared with 10% to 100% in the conventional multiple tower unit commonly in use.

Upon completion of the regeneration cycle, the supply of combustion gas is shut off, and the temperature of the adsorbent is reduced by circulating air in the annular space between the tubes 6, air flowing in at valve 15 and out through stack 16, such circulation being either by natural draft or induced by one or more blowers not shown. During the time required for the regeneration of the adsorbent in tubes 6 and the subsequent cooling thereof before return to the adsorption cycle; the second adsorber 5' is on stream, wet gas being supplied to the adsorbent 9' in tubes 6' by opening valve 3' and valve 19'. While the second adsorber is on the adsorption cycle, valve 14' in flue 13' is closed, as is the burner main valve 21' which controls the supply of fuel gas during the regeneration cycle for the second adsorber. The adsorption and regeneration cycles for the second adsorber are substantially identical with those of the first adsorber, and it is believed that further description of the operation of the second adsorber is unnecessary. The point is that continuous operation is attained by adsorbing moisture in one adsorber while the second is being regenerated, and then reversing the procedure when the first is exhausted and the second has been regenerated. In the event that the adsorption and regeneration cycles are not of the same length, and the regeneration requires more time than the exhaustion of the adsorbent, a third adsorber may be introduced into the system, and the various time cycles balanced accordingly. Once the system is in equilibrium, the entire operation may be made fully automatic by the use of the electrically operated time-controlled valves shown. Not only is the system well adapted for automatic control, but it is likewise highly economical in the quantity of gas required for purging and regeneration, it being kept in mind that in most cases a fairly close balance may be obtained between the quantity of gas necessary for purging and the quantity required for fuel. The principal advantage of the present process is the ability to effect both adsorption and regeneration at high pressure, and the passage of wet gas through the adsorbent at a diminished rate during regeneration, such wet gas functioning to purge the adsorbent and at the same time to supply fuel to heat said adsorbent.

While we have described our invention primarily in connection with the use of activated bauxite as the preferred adsorbent, it is obvious that other solid adsorbents or mixtures may be used. For example, activated fuller's earth, bentonite, acid treated bentonite, silica gel, or activated alumina may be used in lieu of bauxite. Furthermore, the temperature required for regeneration may fall within different ranges depending upon the adsorbent used and the conditions under which the regeneration is carried out. The wet, combustible gas supplied to the dryers, and the drying operation may be carried out to produce either a completely dehydrated gas or one containing a controlled amount of moisture. Depending upon the use to which the gas is to be put, or upon its handling subsequent to drying, the degree of drying may be varied. This may be accomplished by varying the time that the dryer is on the adsorption cycle. If the processed gas is to be completely dehydrated, the adsorption cycle will be considerably shorter than when the gas is only to be partially dehydrated, since the life of the adsorbent is considerably shorter when complete dehydration is required. When drying a wet, combustible gas, it is preferred to remove liquid water (droplets or mist) from the gas prior to charging it to the dryers. This may be effected by passing the wet gas through a separator or tank provided with baffles, steel wool, or other media for mechanically deentraining liquid water. Removal of liquid water from the charge gas reduces the tendency of the solid adsorbent to slake or break down into fines, thus increasing the useful life of the adsorbent. Liquid hydrocarbons, if present, would be deentrained at the same time.

The present invention is particularly adapted to the drying of combustible gases from natural gas wells, natural gasoline recovery plants, petroleum refineries, water-gas and producer gas plants, and the like. Such process may be applied in the drying of individual gases or mixtures, including methane, ethane, ethylene, propane, propylene, the butanes, and the butylenes, hydrogen, and carbon monoxide at pressures ranging from slightly superatmospheric to relatively high pressures of the order of 2500 pounds per square inch or higher. An important advantage of the present process is the ability to carry out both the adsorption and regeneration cycles at high pressure without depressuring the dryers, as is necessary in the case of most gas drying systems now in use, and an additional advantage is the conservation of gas and the adaptability of the process for automatic operation.

We claim:

1. The method of regenerating a solid adsorbent containing moisture adsorbed from a wet combustible gas, which comprises passing said wet gas through said adsorbent, burning at least a portion of the wet gas which is passed through said adsorbent, and passing the resulting combustion products in indirect heat exchange relationship with said adsorbent to increase the temperature of said adsorbent sufficiently to drive off adsorbed moisture during the passage of wet gas therethrough.

2. The method of regenerating bauxite containing moisture adsorbed from a wet combustible gas, which comprises passing said wet gas through said bauxite, burning at least a portion of the wet gas which is passed through said bauxite, and passing the resulting combustion products in indirect heat exchange relationship with said bauxite to increase the temperature of said bauxite sufficiently to drive off adsorbed moisture during the passage of wet gas therethrough.

3. The method of regenerating bauxite containing moisture adsorbed from a wet combustible gas, which comprises passing said wet gas through said bauxite, burning at least a portion of the wet gas which is passed through said bauxite, and passing the resulting combustion products in indirect heat exchange relationship with said bauxite to bring the temperature thereof between 300° F. and 700° F. to drive off adsorbed moisture during the passage of wet gas therethrough.

CARL D. LAUGHLIN.
HARRY M. GWYN, Jr.

REFERENCES CITED

The following references are of record in the file of this patent:

UNITED STATES PATENTS

| Number | Name | Date |
|---|---|---|
| 563,348 | Wing | July 7, 1896 |
| 870,546 | Cooke | Nov. 12, 1907 |
| 1,045,915 | Turner | Dec. 3, 1912 |
| 1,541,147 | Ikeda et al. | June 9, 1925 |
| 1,603,760 | Furkert | Oct. 19, 1926 |
| 1,619,326 | Backhaus | Mar. 1, 1927 |
| 1,887,589 | Farmer | Nov. 15, 1932 |
| 1,887,606 | Thomas | Nov. 15, 1932 |
| 1,948,779 | Abbott et al. | Feb. 27, 1934 |
| 2,034,270 | Reading | Mar. 17, 1936 |
| 2,114,810 | Ray | Apr. 19, 1938 |
| 2,248,956 | Carvlin | July 15, 1941 |
| 2,345,774 | Simpson | Apr. 4, 1944 |

FOREIGN PATENTS

| Number | Country | Date |
|---|---|---|
| 664,953 | Germany | Sept. 16, 1938 |
| 703,155 | France | Apr. 25, 1931 |